(12) United States Patent
Honjo et al.

(10) Patent No.: US 7,572,420 B2
(45) Date of Patent: Aug. 11, 2009

(54) METHOD FOR REMOVING MERCURY IN EXHAUST GAS AND SYSTEM THEREFOR

(75) Inventors: Shintaro Honjo, Hiroshima (JP); Toru Takashina, Hiroshima (JP); Kozo Iida, Hiroshima (JP); Susumu Okino, Hiroshima (JP); Yasuhiro Takeuchi, Tokyo (JP)

(73) Assignee: Mitsubishi Heavy Industries, Ltd. (JP)

( * ) Notice: Subject to any disclaimer, the term of this patent is extended or adjusted under 35 U.S.C. 154(b) by 1002 days.

(21) Appl. No.: 10/815,419

(22) Filed: Apr. 1, 2004

(65) Prior Publication Data
US 2004/0202596 A1     Oct. 14, 2004

(30) Foreign Application Priority Data
Apr. 11, 2003   (JP)   ............... 2003-107482

(51) Int. Cl.
*B01D 53/64* (2006.01)
(52) U.S. Cl. .................................... 423/210
(58) Field of Classification Search ............. 423/210; 422/177, 171, 172
See application file for complete search history.

(56) References Cited

U.S. PATENT DOCUMENTS

| 5,009,871 A * | 4/1991 | Higuchi et al. .......... 423/240 R |
| 2001/0007647 A1 * | 7/2001 | Honjo et al. ................ 423/210 |

FOREIGN PATENT DOCUMENTS

| JP | 2-191526 | * | 7/1990 |
| JP | 2191526 | | 7/1990 |
| JP | 3056123 | | 3/1991 |
| JP | 5220345 | | 8/1993 |
| JP | 10-230137 | * | 9/1998 |
| JP | 10230137 | | 9/1998 |

OTHER PUBLICATIONS

Iida, English abstract of JP10230137, Sep. 2, 1998.*
Kawakami, English absract of JP2191526, Jul. 27, 1990.*

* cited by examiner

*Primary Examiner*—Roy King
*Assistant Examiner*—Yoshitoshi Takeuchi
(74) *Attorney, Agent, or Firm*—Lerner, David, Littenberg, Krumholz & Mentlik, LLP

(57) ABSTRACT

The present invention provides a method for removing mercury in exhaust gas, in which mercury in exhaust gas discharged from combustion equipment is removed, characterized by including a mercury oxidation process in which mercury in the exhaust gas is converted to mercury chloride in the presence of a catalyst; a contact process in which the exhaust gas is brought into contact with an absorbing solution in a scrubber to absorb and remove mercury components from the exhaust gas; and a control process in which blowing of air or addition of an oxidizing agent into the scrubber is accomplished, and the amount of blown air or the added amount of oxidizing agent is regulated to control the oxidation-reduction potential of the absorbing agent, and a system for removing mercury in exhaust gas. According to the mercury removing method in accordance with the present invention, a phenomenon that mercury chloride is reduced into metallic mercury by $SO_2$ etc. and the metallic mercury scatters in the exhaust gas can be prevented, and mercury in the exhaust gas can be decreased effectively.

3 Claims, 5 Drawing Sheets

METHOD FOR REMOVING MERCURY IN EXHAUST GAS AND SYSTEM THEREFOR

TECHNICAL FIELD

The present invention relates to a mercury removing method for removing mercury in exhaust gas discharged from combustion equipment such as a boiler and a mercury removing system therefor.

BACKGROUND ART

In exhaust gas discharged from combustion equipment such as a coal or heavy oil fired boiler, hazardous trace substances such as mercury exist, so that it is necessary to remove these hazardous substances from exhaust gas. It is thought that the mercury in exhaust gas generally is present as water-insoluble metallic mercury (Hg) and water-soluble mercury chloride ($HgCl_2$). Although mercury chloride, which is easily absorbed by water, can be removed by a desulfurization absorption tower or the like, metallic mercury, which has a very low solubility in water, is not absorbed by a desulfurization absorption tower, and may be discharged as metallic mercury vapor without being absorbed.

Conventionally, therefore, there has been proposed, in addition to an activated carbon adsorption method, a sodium hypochlorite absorption method, etc.; a method in which metallic mercury is converted to mercury chloride on a catalyst by adding a chlorinating agent, for example, in a denitrification apparatus filled with the catalyst. The reason for this is that if metallic mercury can be converted to mercury chloride in the presence of a catalyst such as a denitrification catalyst, mercury can be removed by a downstream desulfurization apparatus (see, for example, Japanese Patent Provisional Publication No. 10-230137 (230137/1998)).

Also, since the denitrification catalyst is placed at a high temperature not lower than 300° C. in an exhaust gas treatment system, there has been proposed a method in which considering an adverse influence of the addition of chlorinating agent on the system, a mercury oxidation catalyst is installed separate from the denitrification catalyst (see, for example, Japanese Patent Provisional Publication No. 2001-242596). With this method, metallic mercury can be converted to mercury chloride by chlorine content in exhaust gas in the presence of the mercury oxidation catalyst without the addition of chlorinating agent, and thus mercury can be removed by the desulfurization apparatus.

However, both of the above-described methods have a problem in that when the mercury having been oxidized once is trapped by a downstream scrubber such as a cooling tower and the desulfurization apparatus, it is reduced by the action of $SO_2$ coexisting in flue gas, and is volatized again.

DISCLOSURE OF THE INVENTION

In view of the above problem, the inventors conducted studies earnestly to develop a method for removing mercury in exhaust gas, in which mercury chloride in an absorbing solution is prevented from being reduced into metallic mercury by the action of $SO_2$ etc. and scattered in exhaust gas, and from the viewpoint of environmental protection, mercury is not contained in the treated exhaust gas which is discharged into the air.

As a result, the inventors found that the above-described problem can be solved by controlling the oxidation-reduction potential (ORP) in the absorbing solution by the forced blowing of air into a scrubber or the addition of an oxidizing agent and hence prevent mercury chloride from being reduced into vapor mercury. The present invention was completed from this point of view.

The present invention provides a method for removing mercury in exhaust gas, in which mercury in exhaust gas discharged from combustion equipment is removed, characterized by including a mercury oxidation process in which mercury in the exhaust gas is converted to mercury chloride in the presence of a catalyst; a contact process in which the exhaust gas is brought into contact with an absorbing solution in a scrubber to absorb and remove mercury components from the exhaust gas; and a control process in which at least one of either blowing of air or addition of an oxidizing agent into the scrubber is accomplished, and at least one of either the amount of blown air or the added amount of oxidizing agent is regulated to control the oxidation-reduction potential of the absorbing agent. In the present invention, in the control process, the amount of blown air or the added amount of oxidizing agent can be controlled by detecting at least one of either a combustion equipment load or a mercury concentration at the outlet of the scrubber. Herein, the combustion equipment load is detected by utilizing a phenomenon that the supply amount of $SO_2$ is changed by fuel properties and a boiler load or by other methods, for example, when an electrometer for measuring the oxidation-reduction potential is not provided in the control process.

In the present invention, the mercury removing method can further include an effluent treatment process in which products in the absorbing solution are oxidized by an acid or an oxidizing agent. Furthermore, the mercury removing method can further include a gas-liquid contact process in which a cleaning solution, with which at least one of either air or an oxidizing agent is mixed, is brought into contact with exhaust gas having been subjected to the contact process, and a second contact process in which the oxidation-reduction potential of the cleaning solution is controlled.

Also, the present invention provides a system for removing mercury in exhaust gas, in which mercury in exhaust gas discharged from combustion equipment is removed, characterized by including a catalyst apparatus for converting mercury in the exhaust gas to mercury chloride; a scrubber for removing mercury components by bringing the exhaust gas into contact with an absorbing solution; an introduction pipe, which is provided with a valve for regulating the amount of blown air or the added amount of oxidizing agent, for blowing air or adding the oxidizing agent into the scrubber; and an electrometer for measuring the oxidation-reduction potential of the absorbing agent in the scrubber. In the present invention, the mercury removing system can further include means for continuously detecting at least one of a combustion equipment load and a mercury concentration at the outlet of the scrubber, and means for controlling the amount of blown air or the added amount of oxidizing agent based on the detection value. Furthermore, the mercury removing system can further include a treatment tank, which is provided on the downstream side of the scrubber, for oxidizing products in the absorbing solution by an acid or an oxidizing agent. Still further, the mercury removing system can further include a gas-liquid contact section, which is provided on the downstream side of the scrubber, for bringing a cleaning solution into contact with the exhaust gas by mixing at least one of air and an oxidizing agent in a cleaning tank, and a second electrometer for measuring the oxidation-reduction potential of the cleaning solution.

In one mode of the present invention, a mercury conversion process in which metallic mercury in exhaust gas is converted to mercury chloride is carried out in the presence of a denitrification catalyst or a mercury oxidation catalyst provided on the downstream side of the combustion equipment. At this time, a chlorinating agent is added as necessary on the upstream side of the denitrification catalyst or the mercury oxidation catalyst, and thus metallic mercury is converted to mercury chloride on the catalyst.

In another mode of the present invention, the mercury conversion process, in which metallic mercury in exhaust gas is converted to mercury chloride, is carried out in the presence of the mercury oxidation catalyst provided between the denitrification catalyst provided on the downstream of the combustion equipment and the scrubber. In the case where an air heater (air preheater), a dust collector, a heat exchanger, and the like are provided in the system, the mercury oxidation catalyst can be provided on the upstream or downstream side of these apparatuses. However, it is preferable that the mercury oxidation catalyst be provided in a temperature zone of, for example, 60 to 200° C. where a reaction into mercury chloride takes place easily even when the concentration of HCl in exhaust gas is low. In this case, metallic mercury can be converted to mercury chloride by using HCl contained in exhaust gas.

The mercury removing method in accordance with the present invention is to remove mercury in exhaust gas by the scrubber such as a cooling tower or a desulfurization absorption tower, and in this method, air is blown excessively as one example to prevent mercury having been removed once by the scrubber as $HgCl_2$ from being reduced by $SO_2$ and thereby being re-vaporized (Hg(g)). Thereby, the ORP (oxidation-reduction potential) of the absorbing solution in the scrubber is controlled so that a region in which $HgCl_2$ is stable is provided. When the scrubber is the desulfurization absorption tower, it is preferable that the products (for example, effluent regulatory substances) such as peroxide yielded in the absorbing solution be oxidized in the effluent treatment process.

Also, as another example, the ORP can be controlled likewise by adding an oxidizing agent instead of blowing of air into the scrubber. As the oxidizing agent, for example, NaClO, $Cl_2$, $KmnO_4$, chromic acid, dichromic acid, and $H_2O_2$ can be cited. Also, in addition to the addition of oxidizing agent, a method of air oxidation etc. using metallic salt such as $Fe^{3+}$ or metallic salt as a catalyst can be used.

In addition, in the present invention, the gas-liquid contact section (for example, mist eliminator (M/E) cleaning spray section etc.) for bringing the cleaning solution to which air or an oxidizing agent is added in contact with exhaust gas can be provided at the outlet of the scrubber such as the desulfurization absorption tower. At this time, it is preferable that the cleaning solution be sprayed into exhaust gas after the ORP in a cleaning solution tank is controlled by the blowing of air or the addition of an oxidizing agent so as to be 600 mV or higher, which provides a region in which $HgCl_2$ is stable, to prevent mercury having been removed once by the scrubber as $HgCl_2$ from being reduced by $SO_2$ and thereby being re-vaporized (Hg(g)).

According to the present invention, mercury can be absorbed and removed more surely by fixing mercury in the absorbing solution, so that the removal rate of mercury in exhaust gas can be increased. Also, mercury can be removed surely merely by providing ancillary equipment to the existing equipment, and an apparatus specially designed for mercury removal is not needed, so that space saving and a lower cost exhaust gas treatment system can be anticipated. Especially when air is used for oxidation, an oxidizing agent is not consumed, so that a low cost can be achieved easily.

The following is a detailed description of embodiments of the present invention. The scope of the present invention is not restricted by these embodiments

Figure 1:
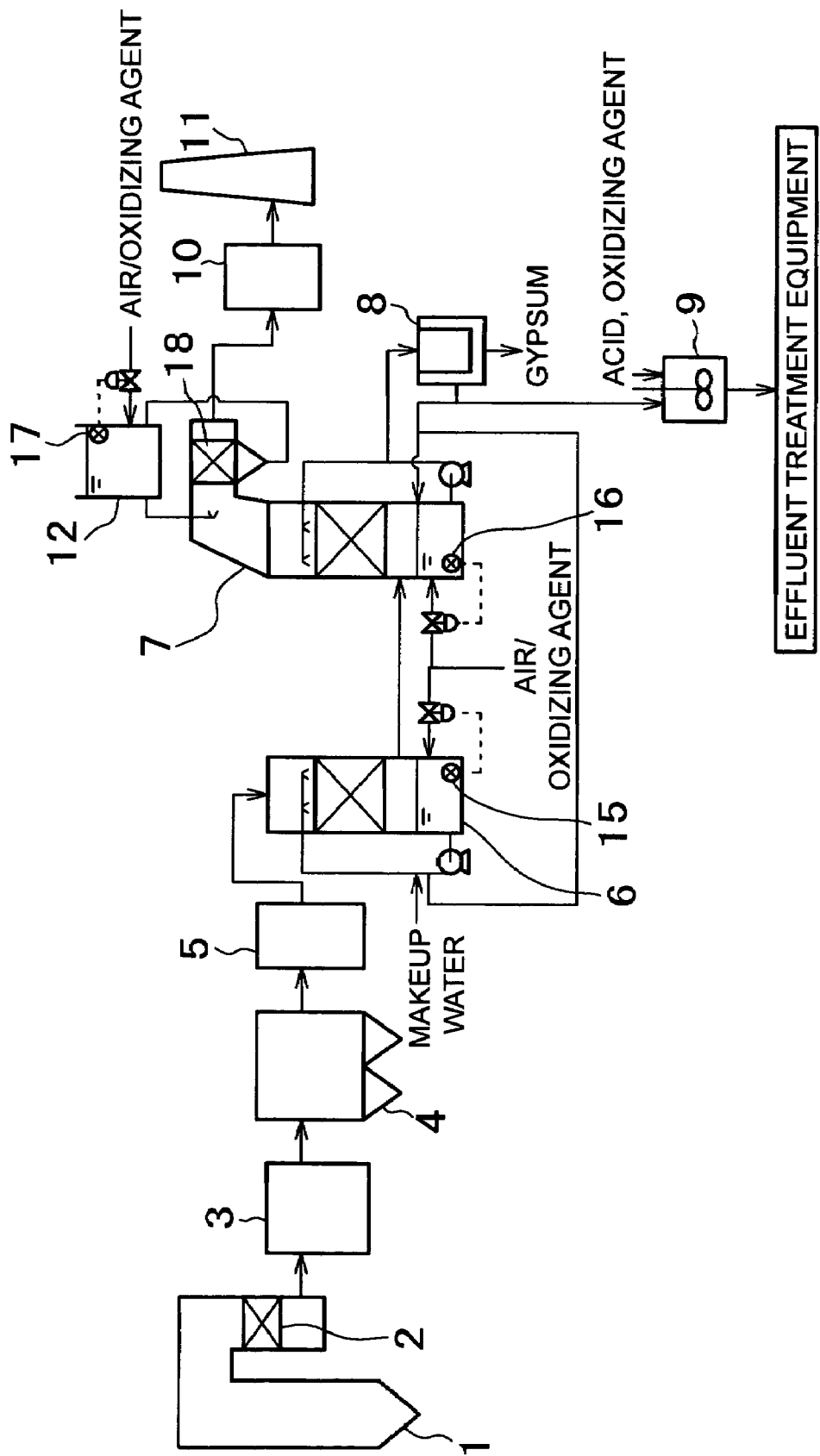
FIG. 1 is a view showing one example of a system for removing mercury in exhaust gas in accordance with the present invention.

In the above figures, reference numeral 1 denotes a boiler, 2 denotes a denitrification apparatus, 3 denotes an air heater (A/H), 4 denotes a dust collector, 5 denotes a heat recovery side heat exchanger (GGH), 6 denotes a cooling tower, 7 denotes a desulfurization absorption tower (wet type desulfurization apparatus), 8 denotes a gypsum separator, 9 denotes a treatment tank, 10 denotes a reheating side heat exchanger (GGH), 11 denotes a stack, 12 denotes a cleaning solution tank, 13 denotes a mercury oxidation catalyst, 14 denotes an electric heater, 15, 16, 17 and 22 each denote an ORP meter, 18 denotes a gas-liquid contact section, 20 denotes a reactor, and 21 denotes a constant-temperature bath.

BEST MODE FOR CARRYING OUT THE INVENTION

Method for Removing Mercury in Exhaust Gas

In a plant requiring denitrification, exhaust gas discharged from combustion equipment such as a boiler is sent to an apparatus provided with a denitrification catalyst having denitrifying action, by which denitrification is accomplished. On the upstream side of the denitrification catalyst, ammonia ($NH_3$) is usually added as a reducing agent.

In the method for removing mercury in exhaust gas in accordance with the present invention, in order to remove mercury in exhaust gas discharged from the combustion equipment, metallic mercury in exhaust gas is converted to mercury chloride in a mercury oxidation process. In this mercury oxidation process, metallic mercury in exhaust gas is converted to mercury chloride by oxidation reaction with hydrogen chloride contained in exhaust gas or an added chlorinating agent in the presence of a catalyst.

In one embodiment of the present invention, the mercury oxidation process, in which metallic mercury in exhaust gas is converted to mercury chloride, is carried out in the presence of the denitrification catalyst or a mercury oxidation catalyst provided on the downstream side of the combustion equipment. At this time, a chlorinating agent is added as necessary on the upstream side of the denitrification catalyst or the mercury oxidation catalyst, and thus metallic mercury is converted to mercury chloride on the catalyst. In the case where metallic mercury is converted to mercury chloride simultaneously with the denitrification process in the presence of the denitrification catalyst, since a denitrification apparatus usually has a high temperature not lower than 300° C., it is effective to add a chlorinating agent such as HCl or ammonium chloride.

In another embodiment of the present invention, the mercury conversion process, in which metallic mercury in exhaust gas is converted to mercury chloride, is carried out in the presence of the mercury oxidation catalyst provided between the denitrification catalyst provided on the downstream of the combustion equipment and a scrubber. When the mercury oxidation process is carried out on the downstream side of the denitrification process, it is preferable that the temperature be controlled so as to be a predetermined temperature in the range of 60 to 200° C. In the case where an air heater (air preheater), a dust collector, a heat exchanger, and the like are provided in the system, the mercury oxidation catalyst can be provided on the upstream or downstream side of these apparatuses. Also, the temperature in the mercury oxidation process can be controlled by measuring the concentration of metallic mercury or mercury chloride in an oxidation catalyst outlet gas in the mercury oxidation process. When the mercury oxidation catalyst is used in this manner, metallic mercury can be converted to mercury chloride by using HCl contained in exhaust gas.

Herein, as the mercury oxidation catalyst, a catalyst in which at least one kind selected from a group consisting of $TiO_2$, $SiO_2$, $ZrO_2$, $Al_2O_3$ and zeolite is used as a carrier, and at least one kind selected from a group consisting of Pt, Ru, Rh, Pd, Ir, V, W, Mo, Ni, Co, Fe, Cr, Cu and Mn is carried on the carrier as an active component can be cited.

Then, in the present invention, the exhaust gas containing mercury chloride is caused to pass through the scrubber provided on the downstream side. As the scrubber, a mode consisting of a desulfurization absorption tower only, a mode consisting of a cooling tower and a desulfurization absorption tower, and the like can be cited. In a contact process in the scrubber, the exhaust gas is brought into contact with an absorbing solution, by which mercury components are absorbed by the absorbing solution and are removed. In the desulfurization absorption tower, likewise, sulfur oxides in exhaust gas are absorbed by an alkali absorbing solution and are removed in a wet desulfurization process.

In this scrubber, either air blow or addition of an additive is accomplished. At this time, at least one of either the amount of blown air or the added amount of additive is regulated to control the oxidation-reduction potential of absorbing solution. When the control is carried out by air blow, in the desulfurization absorption tower, an amount of blown air enough to only oxidize $SO_2$ is insufficient, and an amount of blown air larger than needed for oxidizing $SO_2$ is required. In the present invention, a mode in which the control is carried out by blowing of air only, a mode in which the control is carried out by both blowing of air and addition of oxidizing agent, and a mode in which the control is carried out by addition of oxidizing agent only without an excess amount of blown air can be cited, and all of these modes are included.

The kind of oxidizing agent added into the scrubber is not subject to any special restriction. As the oxidizing agent, for example, NaClO, $Cl_2$, $KmnO_4$, chromic acid, dichromic acid, and $H_2O_2$ can be cited. Also, in addition to the addition of oxidizing agent, a method of air oxidation etc. using metallic salt such as $Fe^{3+}$ or metallic salt as a catalyst can be used. The added amount of oxidizing agent is not subject to any special restriction. For example, when NaClO is added, the concentration of added oxidizing agent is usually in the range of 0.001 to 0.5 mol/l, preferably 0.01 to 0.1 mol/l.

When the oxidizing agent is added, in the addition into the cooling tower, the added amount tends to increase because the pH value in the cooling tower is low. Also, in the addition into the cooling tower, peroxides etc. other than mercury may be yielded. When a wet type electric dust collector is provided in the system, sulfurous acid is oxidized, and thus the acidic property tends to be increased. Such a mode in which oxidizing agent is added is suitable for exhaust gas treatment on a relatively small to medium scale, for example, treatment of refuse incineration exhaust gas because the addition of oxidizing agent entails cost.

The blowing of air into the scrubber is usually accomplished in such a manner that air is blown into the absorbing solution in a minute bubble form. At this time, excess amount of blown air is needed. The excess amount of blown air means that the control can be carried out by operation in a state in which the ORP value of absorbing solution is higher than a predetermined value. The state of excessive air is formed by measuring the ORP value of absorbing solution, and thereby by regulating the amount of blown air.

When air is blown into the desulfurization absorption tower, in the wet desulfurization process, an air blowing apparatus is usually provided to oxidize sulfite in absorbing solution and recover it as gypsum. Therefore, an excess amount of air can be blown by utilizing this apparatus as it is. The amount of blown air more excessive than needed for oxidation of $SO_2$ is attained by measuring the ORP value of absorbing solution, and thereby by regulating the excess amount.

At this time, since the supply amount of $SO_2$ is changed by the properties of fuel and the load of combustion equipment, there can be used a mode in which an optimum ORP control value is calculated from a combustion equipment load signal and fuel properties having been input in advance, and the amount of blown air or the added amount of oxidizing agent is regulated, by which control is carried out more quickly. Also, there can be used a mode in which the concentration of mercury is measured continuously at the outlet of scrubber, and the ORP control value is regulated by the detected mercury concentration signal, by which control is carried out so that the concentration of discharged mercury is lower than a predetermined concentration. For the oxidation-reduction potential (ORP) of absorbing solution in the scrubber, at least one of the amount of blown air and the added amount of oxidizing agent with respect to the amount of treated exhaust gas is regulated to carry out control. By this control, the removal rate of mercury in exhaust gas is kept at a fixed value or higher, but the ORP value to be controlled differs depending on the configuration of scrubber.

For example, in the case of a system in which the scrubber consists of the cooling tower and the desulfurization absorption tower, described later, the amount of blown air or the added amount of oxidizing agent of both the cooling tower and the desulfurization absorption tower or either the cooling tower or the desulfurization absorption tower is regulated, by which the oxidation-reduction potential in the absorbing solution can be controlled in either configuration. Specifically, when air is blown in the cooling tower to control the ORP in a system that treats exhaust gas of 200 $m^3N/h$, the ORP value (V) of solution is raised by an increase in air blow amount ($m^3N/h$), and the mercury removal rate (%) also increases as given in Table 1.

TABLE 1

| ORP (v) | 0.2 | 0.5 | 0.7 | 0.9 | 1 | 1.03 | 1.04 | 1.05 |
|---|---|---|---|---|---|---|---|---|
| Air blow amount ($m^3N/h$) | 0 | 0.05 | 0.1 | 0.2 | 0.5 | 1 | 2.2 | 10 |
| Mercury removal rate (%) | 67 | 85 | 91 | 94 | 95 | 95.5 | 95.6 | 95.6 |

Also, in the case where the ORP is controlled by blowing air in the absorption tower as well, likewise, the ORP value (V) of solution is raised by an increase in air blow amount ($m^3N/h$), and the mercury removal rate (%) also increases as given in Table 2. In the absorption tower, since air is blown to oxidize $SO_2$, it is necessary to blow oxidizing air of an amount corresponding to the amount of $SO_2$ to be treated. However, air of an amount larger than the needed amount (for example, about 0.2 to 1 $m^3N/h$ for 500 ppm of $SO_2$) must be blown.

TABLE 2

| ORP (v) | 0.2 | 0.5 | 0.7 | 0.8 | 0.83 | 0.87 | 0.875 | 0.88 |
|---|---|---|---|---|---|---|---|---|
| Air blow amount ($m^3N/h$) | 0.95 | 1.2 | 1.5 | 2.8 | 4 | 6.5 | 8 | 10 |
| Mercury removal rate (%) | 46 | 55 | 59 | 61 | 62 | 62.3 | 62.3 | 62.3 |

Figure 5:
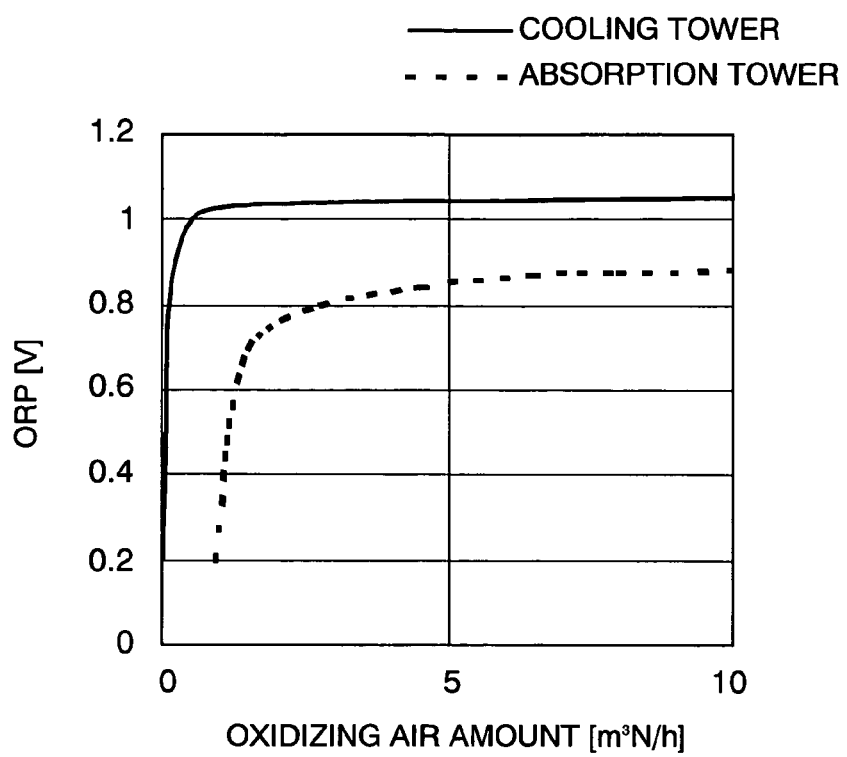
FIG. 5 is a graph showing a change in ORP value with respect to oxidizing air amount for a cooling tower and an absorption tower.
Figure 6:
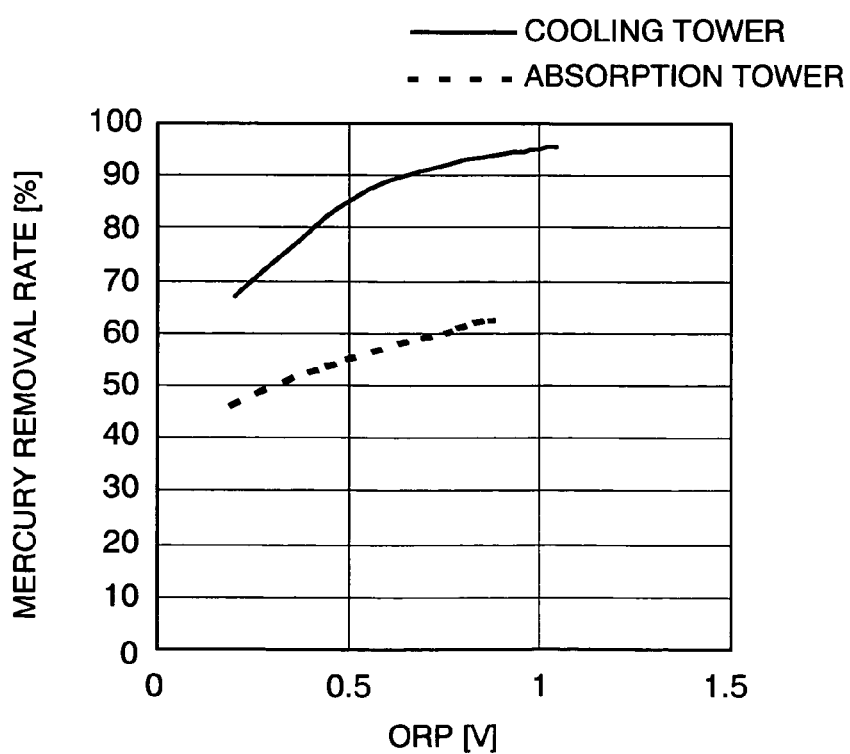
FIG. 6 is a graph showing a change in mercury removal rate with respect to ORP value for a cooling tower and an absorption tower.

FIG. 5 shows a change in ORP value with respect to oxidizing air amount for the cooling tower and the absorption tower in the system that treats 200 $m^3N/h$ of exhaust gas. FIG. 6 shows a change in mercury removal rate with respect to ORP value for the cooling tower and the absorption tower.

From these results, it can be seen that in the system having a cooling tower, for example, by blowing 0.05 $m^3N/h$ or more of air into the cooling tower, the ORP value of the cooling tower is controlled so as to be 500 mV or higher, by which about 85% or more of mercury removal rate can be achieved. Also, it can be seen that by blowing 0.1 $m^3N/h$ or more of air, the ORP value of the cooling tower is controlled so as to be 700 mV or higher, by which about 90% or more of mercury removal rate can be achieved.

Also, it can be seen that, for example, by blowing an excess amount of 2.8 $m^3N/h$ or more of air into the desulfurization absorption tower, the ORP value of the cooling tower is controlled so as to be 800 mV or higher, by which about 61% or more mercury removal rate can be achieved.

In the present invention, by oxidizing the absorbing solution in the scrubber to a predetermined ORP value, the reduction of mercury chloride dissolved in water is prevented, by which mercury can be removed by the scrubber, so that a mercury removal tower or the like need not be provided separately. Also, according to the mode in which the solution is oxidized by excessively blowing air, the consumption of oxidizing agent can be restrained.

In the case of the system in which the scrubber consists of the cooling tower and the desulfurization absorption tower, mercury can be removed efficiently by blowing air into the cooling tower. Also, the mercury removal rate can be increased by excessively blowing air into the desulfurization absorption tower. However, for example, in the case of the system having no cooling tower, a gas-liquid contact process may be provided on the downstream side of the contact process in the scrubber to further increase the mercury removal rate. In the gas-liquid contact process, a cleaning solution in which at least either one of air and oxidizing agent is mixed is brought into contact with the exhaust gas having passed through the contact process. In this case, the exhaust gas having passed through the contact process is a gas, and hence the ORP cannot be measured directly, so that the ORP of a liquid separated and recovered by, for example, a mist eliminator (M/E) is measured. Also, the separated and recovered liquid is mixed with the cleaning solution sprayed from the upstream side of the mist eliminator, and the ORP of this cleaning solution can be measured. At this time, the oxidation-reduction potential of the cleaning solution is controlled by a second control process. The control by mixing of air or an oxidizing agent is carried out by the blowing (mixing) of air and/or the addition (mixing) of oxidizing agent to the cleaning solution sent to the gas-liquid contact section, and the cleaning solution is sprayed into exhaust gas.

Also, in the present invention, there may be provided an effluent treatment process in which products such as peroxide yielded in the absorbing solution are oxidized by an acid or an oxidizing agent on the downstream side of the contact process. The reason for this is that when the ORP in the absorbing solution is set at a high value and is controlled, a large amount of peroxide is yielded in the solution. By providing this effluent treatment process, effluent regulatory substances can be decreased or removed from effluent, and thus the absorbing solution in the scrubber can be sent to the effluent treatment equipment.

System for Removing Mercury in Exhaust Gas

A mercury removing system in accordance with the present invention is a system for removing mercury in exhaust gas discharged from combustion equipment, and is provided with a catalyst apparatus and a scrubber on the downstream side of the combustion equipment. The scrubber is provided with an introduction pipe for blowing air or adding an oxidizing agent and an electrometer for measuring the oxidation-reduction potential of an absorbing solution. In the catalyst apparatus, mercury in exhaust gas is converted to mercury chloride. In the scrubber, exhaust gas is brought into contact with the absorbing solution to remove mercury components. As the scrubber, a mode consisting of a desulfurization absorption tower only, a mode consisting of a cooling tower and a desulfurization absorption tower, and the like can be cited.

FIG. 1 shows one example of a system in which the scrubber consists of the cooling tower and the desulfurization absorption tower. In this system, a gas-liquid contact section is further provided on the downstream side of the desulfurization absorption tower. A specific embodiment of the mercury removing system in accordance with the present invention will now be described with reference to the accompanying drawings.

In the present invention, metallic mercury contained in exhaust gas discharged from a boiler 1 is oxidized into mercury chloride in the presence of a catalyst. After metallic mercury is converted to water-soluble mercury chloride by the catalyst on the upstream side of the scrubber, the exhaust gas is introduced into the scrubber. In the scrubber, desulfurization treatment is carried out by an alkali absorbing solution. By this treatment, SOx is absorbed and removed by bringing the exhaust gas into contact with the absorbing solution such as a lime slurry circulating solution in the desulfurization absorption tower within the system. At the same time, mercury chloride ($HgCl_2$) contained in the exhaust gas is dissolved in the absorbing solution and is removed.

In the system shown in FIG. 1, on the downstream side of the boiler 1, a denitrification apparatus (SCR) 2, an air heater (A/H) 3, which is heating means, a dust collector 4, a heat exchanger (GGH) 5 for recovering heat energy, a cooling tower 6, a desulfurization absorption tower 7, a heat exchanger (GGH) 10 for reheating, and a stack 11 are arranged in that order. Lime slurry obtained in the desulfurization absorption tower 7 is sent to a gypsum separator 8, where a solid content is recovered as gypsum.

In the system shown in FIG. 1, metallic mercury is converted to mercury chloride in the presence of a denitrification catalyst of the denitrification apparatus 2. Therefore, in one example of the denitrification apparatus 2, reducing agent injecting means for injecting a reducing agent containing ammonia is provided on the exhaust gas inflow side of the denitrification catalyst, and also, since the denitrification apparatus has a high temperature not lower than 300° C., chlorinating agent adding means (not shown) for adding a chlorinating agent such as HCl or ammonium chloride is also provided. The shape of the denitrification catalyst of the denitrification apparatus 2 is not subject to any special restriction. For example, a honeycomb-shaped catalyst, a catalyst layer formed by lapping the honeycomb-shaped catalysts, a catalyst layer formed by packing granular catalysts, or the like is used.

As the denitrification catalyst, a catalyst in which an active metal of at least one kind selected from a group consisting of Pt, Pd, Ir, Ru, Cu, Co, Fe, Ag, Mn, Ni, Zn and In is contained in a carrier of at least one kind selected from a group consisting of $Al_2O_3$, $SiO_2$, $ZrO_2$, $TiO_2$, metallosilicate, and zeolite can be used. As the active metal, noble metals of Pt, Pd, Ru, Rh, Ir, etc. are preferable. In particular, Pt-based metals are preferable. Also, as the carrier, metallosilicate, ZSM5, silicalite, Y-type zeolite, mordenite, alumina, silica, titania, etc. can be used preferably.

In the system shown in FIG. 1, the air heater (A/H) 3, which is heating means, and the dust collector 4 are provided. The dust collector 4 is not subject to any special restriction, and may be of any type that can collect dust roughly before exhaust gas is introduced into the scrubber.

On the downstream side of the dust collector 4, the heat exchanger (GGH) 5 for recovering heat energy is provided, and successively the cooling tower 6 and the desulfurization absorption tower (wet type desulfurization apparatus) 7 are provided. As the absorbing solution used for wet desulfurization, an aqueous solution (alkali absorbing solution) of an absorbent such as calcium carbonate, calcium oxide, calcium hydroxide, sodium carbonate, and sodium hydroxide can be cited.

The cooling tower 6 and the desulfurization absorption tower 7 each are provided with an introduction pipe for blowing air or adding the oxidizing agent. The introduction pipe is provided with a valve for regulating the amount of blown air or the added amount of oxidizing agent. An opening/closing mechanism of the valve of the introduction pipe communicating with the cooling tower 6 is connected to an electrometer 15 for measuring the oxidation-reduction potential of absorbing solution in the cooling tower 6. Also, an opening/closing mechanism of the valve of the introduction pipe communicating with the desulfurization absorption tower 7 is connected to an electrometer 16 for measuring the oxidation-reduction potential of absorbing solution in the desulfurization absorption tower 7. By this mechanism, the amount of blown air or the added amount of oxidizing agent is regulated by the oxidation-reduction potential of absorbing solution in the cooling tower 6 or the desulfurization absorption tower 7, by which the ORP can be controlled.

Also, in the system in accordance with the present invention, there can be used a mode in which the opening/closing mechanism of the valve of the introduction pipe communicating with the cooling tower 6 or the desulfurization absorption tower 7 is connected to at least one of a detector for combustion load of the boiler 1 and a mercury concentration meter for continuously measuring mercury concentration at the outlet of the cooling tower 6 or the desulfurization absorption tower 7, by which the amount of blown air or the added amount of oxidizing agent is controlled by a load signal.

In the system shown in FIG. 1, a gas-liquid contact section 18 is additionally provided in the vicinity of an exhaust gas outlet on the downstream side of the desulfurization absorption tower 7 to bring at least one of air and an oxidizing agent into contact with the exhaust gas by mixing them with each other. In the gas-liquid contact section 18, for example, a mist eliminator (M/E) can be provided. A liquid content in the exhaust gas recovered by the separation action of the mist eliminator (M/E) is sent to a cleaning solution tank 12.

In the cleaning solution tank 12, an introduction pipe for blowing air or adding an oxidizing agent is provided. This introduction pipe is provided with a valve for regulating the amount of blown air or the added amount of oxidizing agent. An opening/closing mechanism of the valve of the introduction pipe is connected to a second electrometer 17 for measuring the oxidation-reduction potential of cleaning solution. By this mechanism, the amount of blown air or the added amount of oxidizing agent is regulated by the oxidation-reduction potential of cleaning solution in the cleaning solution tank 12, by which the ORP can be controlled. It is preferable that the ORP be controlled so as to be, for example, 600 mV or higher, which provides a region in which $HgCl_2$ is stable. The kind and added amount of oxidizing agent is the same as those in the case where an oxidizing agent is added into the scrubber.

The cleaning solution whose ORP has been controlled as described above is returned again to an exhaust gas flow path on the downstream side of the desulfurization absorption tower 7 through a spray section such as a cleaning spray. By spraying the cleaning solution into exhaust gas in this manner, gas-liquid contact occurs effectively in the mist eliminator (M/E), and resultantly mercury can be prevented from being reduced again by $SO_2$ in the absorbing solution and thereby being re-vaporized (Hg(g)).

Also, in the system shown in FIG. 1, a treatment tank 9 is provided on the downstream side of the desulfurization absorption tower 7 to oxidize products in the absorbing solution by an acid or an oxidizing agent. Since, for example, when the ORP in the absorbing solution is set at a high value and is controlled, a large amount of peroxide is yielded in the absorbing solution, by providing the treatment tank 9 before effluent treatment equipment, effluent regulatory substances can be decreased or removed from effluent.

In the system in accordance with the present invention, the heat exchanger 10 for reheating is provided on the downstream side of the desulfurization absorption tower 7, and exhaust gas is discharged from the stack 11 into the air through this apparatus. In the heat exchanger 10 for reheating, combustion exhaust gas whose temperature has been lowered is heated by heat energy recovered by the heat exchanger 5 for recovering heat provided on the upstream side of the desulfurization absorption tower 7. The heat exchanger 5 for recovering heat and the heat exchanger 10 for reheating each are usually formed by a gas heater of a system in which heat energy is exchanged with a heat medium being used as a medium. The heat exchangers 5 and 10 may be a gas-gas heater, in which heat exchange is accomplished directly, or a separate system.

The present invention is not limited to the system shown in FIG. 1, and there can be used a configuration in which a mercury oxidation catalyst for carrying out a mercury oxidation process is provided separately from the denitrification catalyst of the denitrification apparatus 2. The mercury oxidation catalyst is provided on the downstream side of the denitrification apparatus 2 and the upstream side of the cooling tower 6. In the case of a configuration in which the mercury oxidation catalyst is provided on the downstream side of the air heater (A/H) 3, usually, chlorinating agent adding means for adding a chlorinating agent such as HCl is not provided. The reason for this is that in the exhaust gas from the boiler 1, a Cl content in fuel exists as HCl, and the mercury oxidation catalyst is provided on the low temperature side of the denitrification apparatus 2, so that metallic mercury (Hg) can be oxidized into mercury chloride ($HgCl_2$) on the catalyst. In this configuration as well, $HgCl_2$ is removed simultaneously with the removal of $SO_2$ in exhaust gas in the cooling tower 6 or the desulfurization absorption tower 7.

As the mercury oxidation catalyst used in the present invention, a catalyst in which at least one kind selected from a group consisting of $TiO_2$, $SiO_2$, $ZrO_2$, $Al_2O_3$ and zeolite is used as a carrier, and at least one kind selected from a group consisting of Pt, Ru, Rh, Pd, Ir, V, W, Mo, Ni, Co, Fe, Cr, Cu and Mn is carried on the carrier as an active component can be cited. As the carrier, titanium oxides or silicon oxides or composite oxides thereof are preferably used. A catalyst in which a composite oxide containing $TiO_2$ or $SiO_2$ is used as a carrier and an oxide of vanadium, tungsten, molybdenum, or the like is carried as active metal species has a high activity. For the mercury oxidation catalyst, an arbitrary shape can be selected according to the system configuration. Any integrally molded shape such as a pellet shape, plate shape, cylindrical shape, corrugated shape, or honeycomb shape can be used.

The exhaust gas to be treated in the present invention is a boiler exhaust gas of a thermal electric power station, factory, etc. in which fuel containing sulfur and mercury, such as coal or heavy oil, is burned, or a heating furnace exhaust gas of a metal factory, refinery, petrochemical plant, etc., so that it contains carbon dioxide, oxygen, SOx, smoke and soot, and water, and has a large discharge amount.

As described above, according to the present invention, mercury can be absorbed and removed more surely by fixing mercury in the absorbing solution or by separating mercury in the cleaning solution, so that the removal rate of mercury in exhaust gas can be increased. Also, mercury can be removed surely merely by providing ancillary equipment to the existing equipment, and an apparatus specially designed for mercury removal is not needed, so that space saving and a lower cost exhaust gas treatment system can be anticipated. Especially when air is used for oxidation, an oxidizing agent is not consumed, so that a low cost can be achieved easily.

The following experiments were conducted to verify the effect of removing mercury in the present invention, but the present invention is not restricted by the description of these examples.

EXAMPLES

Example 1

Figure 2:
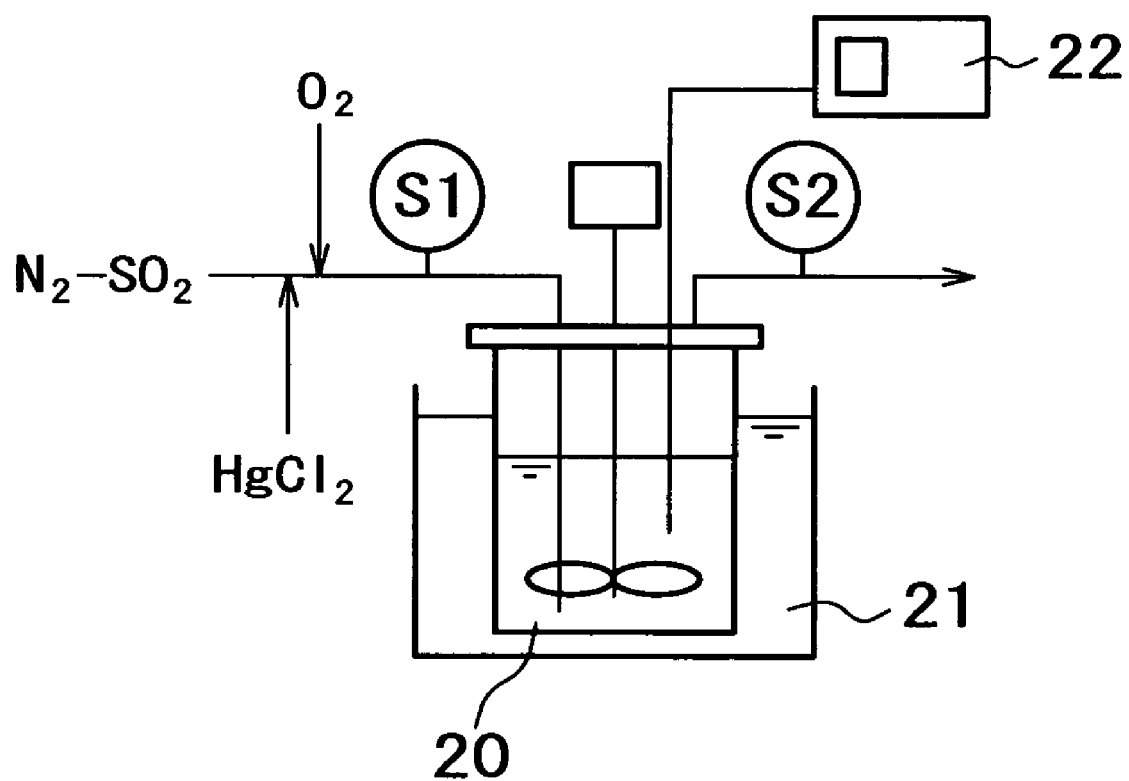
FIG. 2 is a schematic view of a device used for a mercury absorption test in example 1.

A test was carried out by using a mercury absorbing test device shown in FIG. 2 to examine a condition in which mercury chloride is reduced by sulfur oxide ($SO_2$).

In the device of example 1, $O_2$ was added to $N_2$ gas containing $SO_2$, and mercury chloride ($HgCl_2$) was mixed thereto, by which a simulation gas was prepared. The simulation gas was introduced into a reactor 20 whose temperature was controlled by a constant-temperature bath 21, and was stirred by a stirring blade provided in the reactor 20. For the solution in the reactor 20, the oxidation-reduction potential thereof was measured by an ORP meter 22. The gas in the reactor 20 was discharged from an outlet on top of the reactor 20. An inlet gas was sampled at S1, and an outlet gas at S2.

The test conditions were as described below: the contents of added components were $O_2$: 4.0%, 10%, $SO_2$: 1000 ppm, and $HgCl_2$: 10 µg/m³N, the pressure was ordinary pressure, the reactor temperature was 60° C., the solution composition was pure water, and NaClO was used as an added oxidizing agent. Table 3 gives the test results.

TABLE 3

|  | Sample 1 | Sample 2 | Sample 3 |
|---|---|---|---|
| Inlet $HgCl_2$ concentration (µg/m³N) | 10 | 10 | 10 |
| Inlet $SO_2$ concentration (ppm) | 1000 | 1000 | 1000 |
| Inlet $O_2$ concentration (%) | 4 | 10 | 10 |
| Concentration of added oxidizing agent (mol/l) | 0 | 0 | 0.1 |
| ORP(V) | 0.1 | 0.6 | 0.85 |
| Mercury removal rate (%) | 90 | 95 | 98 |

From the test results given in Table 3, it was seen that by the increase in oxygen concentration and the addition of oxidizing agent, in all samples, the ORP value is increased and the mercury removal rate is increased. Also, it could be confirmed that by increasing oxygen concentration without the addition of oxidizing agent, the ORP value is increased to 600 mV and a mercury removal rate of 95% can be achieved.

Example 2

Figure 3:
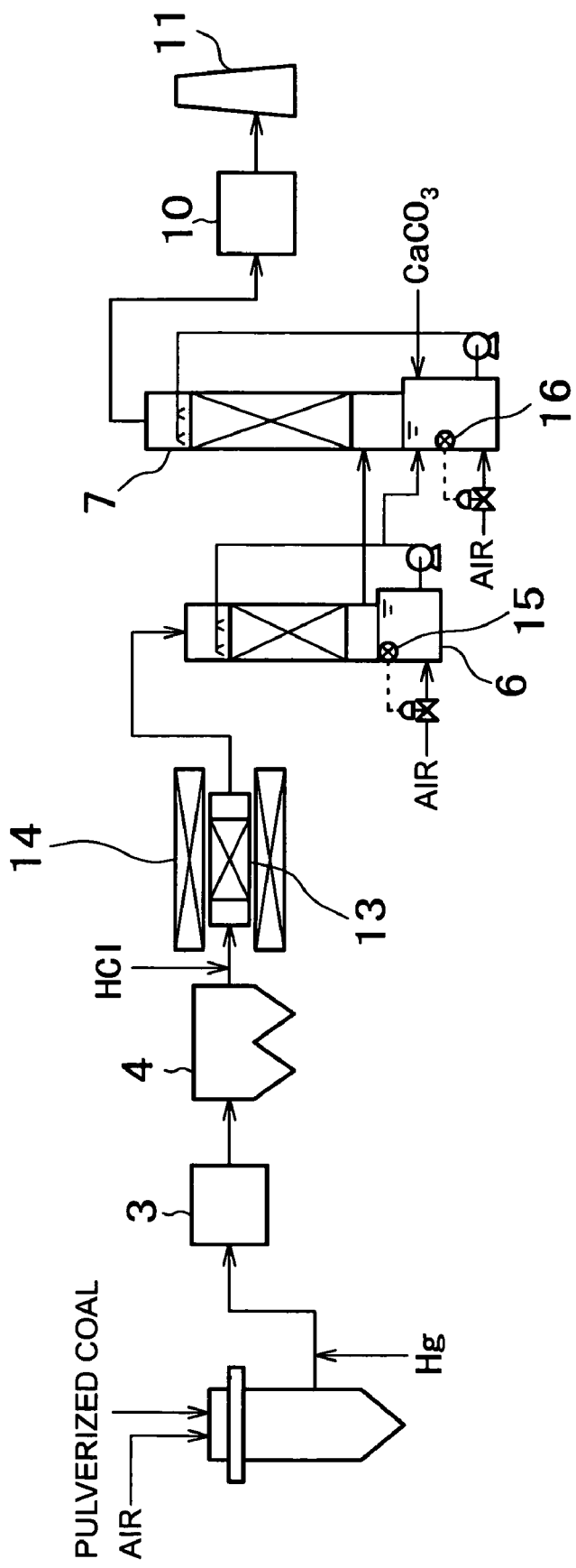
FIG. 3 is a system configuration view for illustrating the outline of mercury removing system of example 2.

A test for evaluating the mercury removal rate was carried out by using a system for removing mercury in exhaust gas shown in FIG. 3.

In the system of example 2, combustion equipment for burning pulverized coal together with air, an air heater (A/H) 3, an electric dust collector 4, a mercury oxidation catalyst 13 kept warm by an electric heater 14, a cooling tower 6, a desulfurization absorption tower 7, a heat exchanger (GGH) 10, and a stack 11 are arranged in that order. The cooling tower 6 is provided with an introduction pipe for blowing air, and the introduction pipe is provided with a valve for regulating the amount of blown air. An opening/closing mechanism of the valve is connected to an electrometer 15 for measuring the oxidation-reduction potential of an absorbing solution in the cooling tower 6. Similarly, the desulfurization absorption tower 7 is also provided with an introduction pipe provided with a valve, and an opening/closing mechanism of the valve is connected to an electrometer 16.

In the test using the system shown in FIG. 3, metallic mercury was added between the combustion equipment and the air heater (A/H) 3. Next, HCl was added just before the mercury oxidation catalyst 13, by which metallic mercury was converted to mercury chloride on the catalyst. For both of the cooling tower 6 and the desulfurization absorption tower 7, the oxidation-reduction potential was measured in the absorbing solution, and air was introduced through the introduction pipe. $CaCO_3$ was added into the desulfurization absorption tower 7.

An inlet gas was sampled just before the cooling tower 6, and an outlet gas was sampled just behind the cooling tower 6 and just behind the desulfurization absorption tower 7. An outlet gas for the whole system was sampled on the downstream side of the desulfurization absorption tower 7. The test conditions were as described below: the amount of gas was 200 m³N/h, the contents of added components were $H_2O$: 8%, $CO_2$: 14%, $O_2$: 4%, $N_2$: 74%, HCl: 10 ppm, and $SO_2$: 500 ppm, the mercury concentration was Hg: 10 µg/m³N, the pressure was ordinary pressure, the kind of the mercury oxidation catalyst 13 was $V_2O_5$(4 wt %)-$WO_3$(5wt %)/$TiO_2$, the catalyst temperature was 150° C., and the catalyst SV was 6000h$^{-1}$. Also, the temperature of the cooling tower 6 was 55° C., the composition of solution in the cooling tower 6 was pure water (initial stage), the temperature of the desulfurization absorption tower 7 was 55° C., and the composition of solution in the desulfurization absorption tower 7 was 20 wt % $CaSO_4$.

In comparative experiment 1, air was not blown into the cooling tower 6, in experiment 1, air was blown into the cooling tower 6 (0.1 m³N/h), and in experiment 2, air was blown into the cooling tower 6 and an excess amount of air was blown into the desulfurization absorption tower 7 (1.5 m³N/h). Table 4 gives the test results.

TABLE 4

|  | Comparative experiment 1 | Experiment 1 | Experiment 2 |
|---|---|---|---|
| Inlet total Hg concentration (µg/m³N) | 10 | 10 | 10 |
| Inlet $SO_2$ concentration (ppm) | 500 | 500 | 500 |
| Inlet HCl concentration (ppm) | 10 | 10 | 10 |
| Inlet $O_2$ concentration (%) | 4 | 4 | 4 |

TABLE 4-continued

|  | Comparative experiment 1 | Experiment 1 | Experiment 2 |
|---|---|---|---|
| Cooling tower air amount ($m^3N/h$) | 0 | 0.1 | 0.1 |
| Desulfurization absorption tower air amount ($m^3N/h$) | 0.95 | 0.95 | 1.5 |
| Cooling tower ORP (V) | 0.2 | 0.7 | 0.7 |
| Desulfurization absorption tower ORP (V) | 0.2 | 0.2 | 0.7 |
| Catalyst mercury oxidation rate (%) | 95 | 95 | 95 |
| Cooling tower mercury removal rate (%) | 67 | 91 | 91 |
| Desulfurization absorption tower mercury removal rate (%) | 70 | 46 | 59 |
| Total mercury removal rate (%) | 90 | 95 | 96 |

From the test results given in Table 4, it could be confirmed that as compared with comparative experiment 1, in experiments 1 and 2 in which air was blown into the cooling tower 6, mercury removal in the cooling tower 6 occurred at a high rate, and the total mercury removal rate was increased. It could also be confirmed that even when an excess amount of air was blown into the desulfurization absorption tower 7, the mercury removal rate was increased.

Example 3

Figure 4:
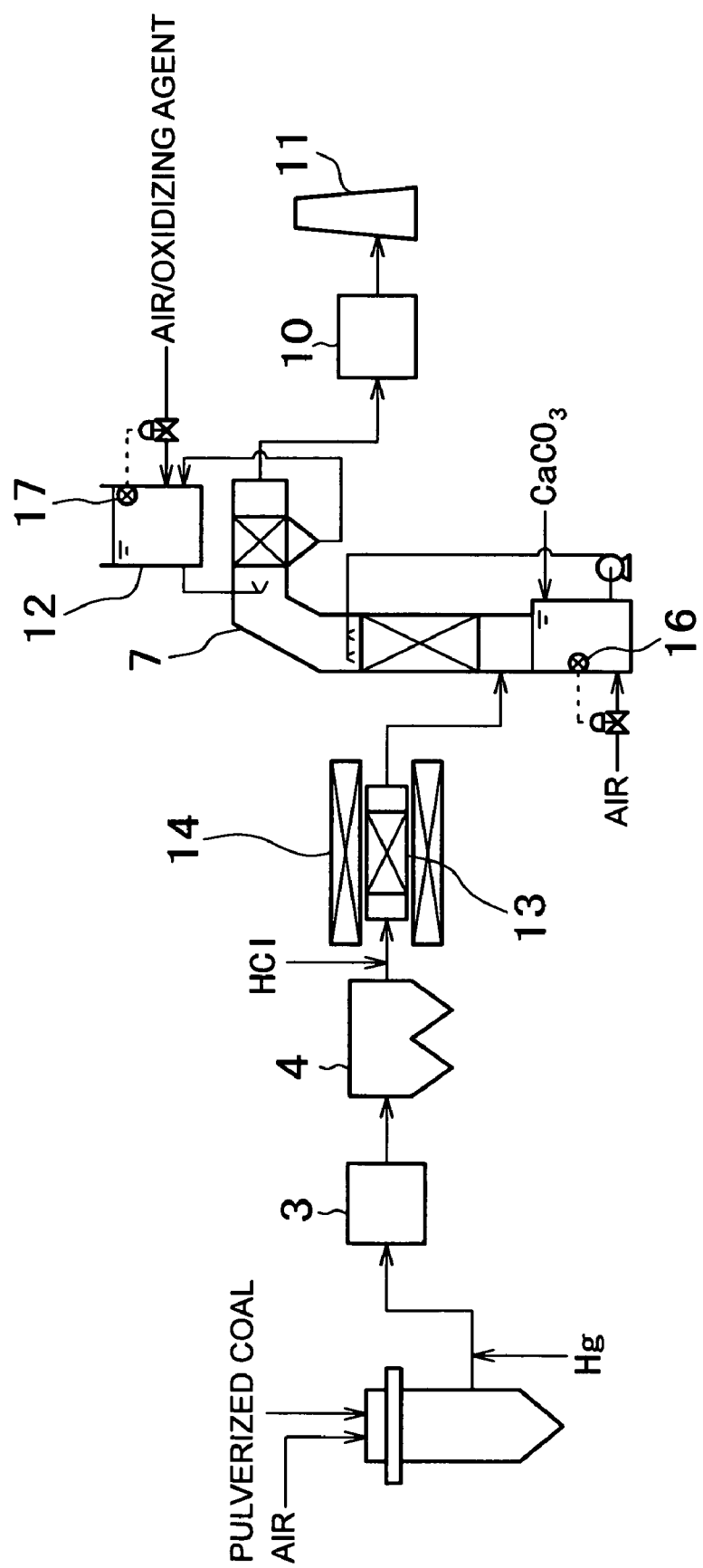
FIG. 4 is a system configuration view for illustrating the outline of mercury removing system of example 3.

A test for evaluating the mercury removal rate was carried out by using a system for removing mercury in exhaust gas shown in FIG. 4.

In the system of example 3, combustion equipment for burning pulverized coal together with air, an air heater (A/H) 3, an electric dust collector 4, a mercury oxidation catalyst 13 kept warm by an electric heater 14, a desulfurization absorption tower 7, a heat exchanger (GGH) 10, and a stack 11 are arranged in that order. At the lower part of the desulfurization absorption tower 7 is provided an introduction pipe for blowing air, and the introduction pipe is provided with a valve for regulating the amount of blown air. An opening/closing mechanism of the valve is connected to an electrometer 16 for measuring the oxidation-reduction potential of an absorbing solution.

In an exhaust gas flow path on the downstream of the desulfurization absorption tower 7, a gas-liquid contact section 18 is provided. In the gas-liquid contact section 18, a mist eliminator is provided. A liquid content in the exhaust gas recovered by the separation action of the mist eliminator is sent to a cleaning solution tank 12. In the cleaning solution tank 12, an introduction pipe for blowing air or adding an oxidizing agent is provided. This introduction pipe is provided with a valve for regulating the amount of blown air or the added amount of oxidizing agent. An opening/closing mechanism of the valve of the introduction pipe is connected to a second electrometer 17 for measuring the oxidation-reduction potential of cleaning solution in the cleaning solution tank 12. The cleaning solution whose ORP has been controlled is returned again to an exhaust gas flow path on the downstream side of the desulfurization absorption tower 7 through a spray section such as a cleaning spray.

In the test using the system shown in FIG. 4, metallic mercury was added between the combustion equipment and the air heater (A/H) 3. Next, HCl was added just before the mercury oxidation catalyst 13, by which metallic mercury was converted to mercury chloride on the catalyst. For both of the desulfurization absorption tower 7 and the cleaning solution tank 12, the oxidation-reduction potential was measured in the solution, and air was introduced through the introduction pipe. $CaCO_3$ was added into the desulfurization absorption tower 7.

An inlet gas was sampled just before the desulfurization absorption tower 7, and an outlet gas was sampled just behind the desulfurization absorption tower 7 and just behind the gas-liquid contact section 18. An outlet gas for the whole system was sampled on the downstream side of the gas-liquid contact section 18.

The test conditions were as described below: the amount of gas was 200 $m^3N/h$, the contents of added components were $H_2O$: 8%, $CO_2$: 14%, $O_2$: 4%, $N_2$: 74%, HCl: 5 ppm, and $SO_2$: 500 ppm, the mercury concentration was Hg: 10 $\mu g/m^3N$, the pressure was ordinary pressure, the kind of the mercury oxidation catalyst 13 was $V_2O_5$(4 wt %)-$WO_3$(5 wt %)/$TiO_2$, the catalyst temperature was 150° C., and the catalyst SV was 6000 $h^{-1}$. Also, the temperature of the desulfurization absorption tower 7 was 55° C., the composition of solution in the desulfurization absorption tower 7 was 20 wt % $CaSO_4$, the temperature of the cleaning solution was 55° C., the composition of the cleaning solution was pure water, and the added oxidizing agent was 1% NaClO.

In comparative experiment 2, neither was air blown nor an oxidizing agent added into the cleaning solution tank 12; in experiment 3, air was blown into the cleaning solution tank 12, and in experiment 4, air was blown and an oxidizing agent was added into the cleaning solution tank 12. Table 5 gives the test results.

TABLE 5

|  | Comparative experiment 2 | Experiment 3 | Experiment 4 |
|---|---|---|---|
| Inlet total Hg concentration ($\mu g/m^3N$) | 10 | 10 | 10 |
| Inlet $SO_2$ concentration (ppm) | 500 | 500 | 500 |
| Inlet HCl concentration (ppm) | 5 | 5 | 5 |
| Inlet $O_2$ concentration (%) | 4 | 4 | 4 |
| Amount of air blown into M/E cleaning solution ($m^3N/h$) | 0 | 0.1 | 0.1 |
| Amount of oxidizing agent added to M/E cleaning solution (kg/h) | 0 | 0 | 2 |
| M/E cleaning solution ORP (V) | 0.1 | 0.7 | 0.7 |
| Catalyst mercury oxidation rate (%) | 95 | 95 | 95 |
| Desulfurization absorption tower mercury removal rate (%) | 68 | 68 | 68 |
| Gas-liquid contact section mercury removal rate (%) | 36 | 81 | 86 |
| Total mercury removal rate (%) | 79 | 94 | 95 |

From the test results given in Table 5, it could be confirmed that as compared with comparative experiment 2, in experiments 3 and 4 in which the gas-liquid contact section was provided and air was blown or an oxidizing agent was added into the cleaning solution tank 12, mercury removal in the gas-liquid contact section occurred at a high rate, and the total mercury removal rate was increased.

The above is an explanation of the present invention given with reference to embodiments and examples. These embodiments and examples are offered for ease of understanding of the present invention, and do not restrict the claims of the present invention.

The invention claimed is:

1. A method for removing mercury in exhaust gas, in which mercury in exhaust gas discharged from combustion equipment is removed, characterized by comprising:
- a mercury oxidation process in which mercury in said exhaust gas is converted to mercury chloride in the presence of a catalyst;
- a contact process in which said exhaust gas is brought into contact with an absorbing solution in a scrubber to absorb and remove mercury components from said exhaust gas;
- a control process in which blowing of air into said scrubber is accomplished, and the amount of blown air is regulated to control the oxidation-reduction potential of said absorbing agent; and
- a gas liquid contact process comprising a mist eliminator which includes a cleaning solution, to which air is added, which is in contact with said exhaust gas, wherein the oxidation-reduction potential of said cleaning solution is controlled by the blowing of air, so as to be at least 600 mV.

2. The method for removing mercury according to claim 1, characterized in that in said control process, at least one of either a combustion equipment load or a mercury concentration at the outlet of said scrubber is detected to control the amount of blown air.

3. The method for removing mercury according to claim 1 or 2, characterized in that said method further comprises an effluent treatment process in which products in said absorbing solution are oxidized by an acid or an oxidizing agent.

* * * * *